(12) United States Patent
Moore et al.

(10) Patent No.: US 8,356,728 B2
(45) Date of Patent: Jan. 22, 2013

(54) ROTATABLE TOP SHELL

(75) Inventors: Joshua Moore, Sunnyvale, CA (US); Daehwan Daniel Kim, Sunnyvale, CA (US); Gary Dean Sasser, San Jose, CA (US)

(73) Assignee: Finisar Corporation, Sunnyvale, CA (US)

( * ) Notice: Subject to any disclaimer, the term of this patent is extended or adjusted under 35 U.S.C. 154(b) by 1112 days.

(21) Appl. No.: 12/039,677

(22) Filed: Feb. 28, 2008

(65) Prior Publication Data

US 2008/0203864 A1  Aug. 28, 2008

Related U.S. Application Data

(60) Provisional application No. 60/892,199, filed on Feb. 28, 2007.

(51) Int. Cl.
*B65D 43/14* (2006.01)
*B65D 51/04* (2006.01)
(52) U.S. Cl. ........ 220/811; 220/810; 220/817; 220/836; 220/833; 385/92; 49/257; 49/260
(58) Field of Classification Search .................... 385/92; 220/833, 834, 835, 810, 326, 324, 811; 49/257, 49/260
See application file for complete search history.

(56) References Cited

U.S. PATENT DOCUMENTS

| | | | | |
|---|---|---|---|---|
| 2,557,812 A | * | 6/1951 | Budlong | 206/104 |
| 2,830,725 A | * | 4/1958 | Penfold et al. | 220/811 |
| 4,327,482 A | | 5/1982 | Araki et al. | |
| 4,701,139 A | * | 10/1987 | Good et al. | 439/497 |
| 5,362,245 A | * | 11/1994 | Suguro et al. | 439/160 |
| 5,621,311 A | | 4/1997 | Kamiya | |
| 6,047,874 A | | 4/2000 | Asai et al. | |
| 6,409,159 B1 | | 6/2002 | Asai et al. | |
| 6,554,494 B2 | * | 4/2003 | Bruland et al. | 385/92 |
| 6,671,450 B2 | | 12/2003 | Khan et al. | |
| 6,744,639 B1 | | 6/2004 | Branch et al. | |
| 6,789,950 B1 | * | 9/2004 | Loder et al. | 385/53 |

(Continued)

FOREIGN PATENT DOCUMENTS

JP   04-250419   9/1992

(Continued)

OTHER PUBLICATIONS

Moore, Joshua et al., Collar Clip for an Electronic Module, U.S. Appl. No. 12/038,689, filed Feb. 27, 2008.
Moore, Joshua et al., Positioning Plate for Optical Subassembly, U.S. Appl. No. 12/039,598, filed Feb. 28, 2008.

(Continued)

*Primary Examiner* — J. Gregory Pickett
*Assistant Examiner* — Blaine Neway
(74) *Attorney, Agent, or Firm* — Maschoff Gilmore & Israelsen

(57) ABSTRACT

In one example, a rotatable top shell is provided for an example optoelectronic device. The rotatable top shell includes a body defining a curved tongue on one end. The tongue is configured to rotate about a complimenting curved mating surface of a bottom shell of the optoelectronic device to allow the body to rotate between an open position and a closed position. The rotatable top shell further includes means for securing the rotatable top shell relative to the bottom shell. The means for securing the rotatable top shell may include one or more of: a plurality of nubs defined along at least one edge of the body, a hole defined in the body for receiving a retention pin of the bottom shell, two sides for being received within a main cavity of the bottom shell, or the like.

19 Claims, 4 Drawing Sheets

U.S. PATENT DOCUMENTS

| | | | |
|---|---|---|---|
| 7,003,230 B2 * | 2/2006 | Branch et al. | 398/135 |
| 7,275,937 B2 | 10/2007 | Ellison | |
| 7,287,916 B2 | 10/2007 | Mizue | |
| 7,306,377 B2 | 12/2007 | Ellison | |
| 7,309,170 B2 | 12/2007 | Ice | |
| 7,559,702 B2 * | 7/2009 | Fujiwara et al. | 385/88 |
| 2002/0110336 A1 | 8/2002 | Adair et al. | |
| 2003/0171022 A1 | 9/2003 | Distad et al. | |
| 2004/0037517 A1 | 2/2004 | Dair et al. | |
| 2004/0151443 A1 | 8/2004 | Mizue | |
| 2006/0140552 A1 | 6/2006 | Mizue et al. | |
| 2006/0215968 A1 | 9/2006 | Kayner et al. | |
| 2006/0215970 A1 | 9/2006 | Mizue et al. | |
| 2007/0117458 A1 | 5/2007 | Winker et al. | |
| 2007/0189673 A1 | 8/2007 | Yoshikawa | |
| 2007/0237466 A1 | 10/2007 | Togami et al. | |
| 2008/0078576 A1 | 4/2008 | Blacker et al. | |
| 2008/0233799 A1 | 9/2008 | Winker et al. | |

FOREIGN PATENT DOCUMENTS

| | | |
|---|---|---|
| JP | 11-150154 | 6/1999 |
| KR | 10-2004-0072926 | 8/2004 |
| KR | 10-2005-0038504 | 4/2005 |
| WO | 2008/106620 | 9/2008 |

OTHER PUBLICATIONS

Moore, Joshua et al., Printed Circuit Board Positioning Mechanism, U.S. Appl. No. 12/038,708, filed Feb. 27, 2008.
Moore, Joshua, Angular Seam for an Electronic Module, U.S. Appl. No. 12/038,721, filed Feb. 27, 2008.
Moore, Joshua, Optical Subassembly Positioning Device for an Electronic Module, U.S. Appl. No. 12/038,784, filed Feb. 27, 2008.
U.S. Appl. No. 12/038,784, Mail date Sep. 8, 2008, Notice of Allowance.
U.S. Appl. No. 12/038,708, Mail date Jun. 23, 2008, Office Action.
U.S. Appl. No. 12/038,708, Mail date Nov. 12, 2008, Notice of Allowance.
U.S. Appl. No. 12/039,598, Mail date Oct. 7, 2009, Notice of Allowance.
U.S. Appl. No. 12/038,689, Mail date Mar. 23, 2009, Notice of Allowance.
U.S. Appl. No. 12/038,708, Mail date Sep. 19, 2008, Interview Summary.
U.S. Appl. No. 12/038,721, Mail date Oct. 13, 2010, Office Action.
U.S. Appl. No. 12/038,721, Mail date Apr. 15, 2011, Office Action.
U.S. Appl. No. 12/038,721, Mail date Oct. 20, 2011, Notice of Allowance

* cited by examiner

US 8,356,728 B2

ROTATABLE TOP SHELL

CROSS-REFERENCE TO RELATED APPLICATIONS

This application claims priority to U.S. Provisional Patent Application Ser. No. 60/892,199 filed on Feb. 28, 2007, entitled ELECTRONIC MODULE MECHANICAL SYSTEMS, which is incorporated herein by reference in its entirety.

BACKGROUND OF THE INVENTION

1. The Field of the Invention

The present invention relates generally to the field of optoelectronic modules. More specifically, embodiments of the present invention relate to a shell for use in an optoelectronic transceiver module and other optoelectronic devices.

2. The Relevant Technology

Modules, such as electronic or optoelectronic transceiver or transponder modules are increasingly used in electronic and optoelectronic communication. Some electronic modules can be plugged into a variety of host networking equipment. Multi-Source Agreements ("MSAs"), such as the SFF MSA, the SFP MSA, and the SFP+ (IPF) MSA specify, among other things, package dimensions for modules. Conformity with an MSA allows a module to be plugged into host equipment designed in compliance with the MSA. Modules typically communicate with a printed circuit board of a host device by transmitting electrical signals to the printed circuit board and receiving electrical signals from the printed circuit board. These electrical signals can then be transmitted by the modules outside the host device as optical and/or electrical signals.

One common difficulty associated with many optoelectronic modules concerns the establishment and maintenance of accurate optical alignment between various optical components. In some cases, inaccurate alignment of the various optical components can impair the proper operation of the module.

Another challenge associated with some modules concerns the assembly of the modules. For example, a module generally includes various components that must be secured within the module. Due to limitations in size and space, it can be difficult to secure components accurately and permanently within a module. Many times, module shells play an important role, among other things, in securing the components in place within the module. Some shell designs include a top shell and a bottom shell.

Some conventional top shells are made of sheet metal while others are die cast. In some cases, the top shells may be fastened (e.g., using a fastener such as a screw or the like) to the bottom shell for locking the modules. The use of fasteners with conventional shell designs adds to the bulk, cost and assembly time of the module and also causes difficulty when there is limited space.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY OF THE INVENTION

These and other limitations are overcome by embodiments of the invention which relate to a top shell of an optoelectronic transceiver module that is configured to be rotatably coupled to a bottom shell of the optoelectronic transceiver module. Alternately or additionally, embodiments of the invention may include an optoelectronic device shell that includes a rotatable top shell and a corresponding bottom shell.

In one embodiment, a rotatable top shell is provided that includes a body. On one end of the body a curved tongue is defined. The tongue is configured to rotate about a complimenting curved mating surface of a bottom shell of an optoelectronic transceiver module to allow the body to rotate between an open position and a closed position. The rotatable top shell additionally includes means for securing the rotatable top shell relative to the bottom shell. The tongue and the means for securing the rotatable top shell are configured to substantially secure the body in an x-direction, a y-direction, and a z-direction when the body is in the closed position.

In another embodiment, an optoelectronic device shell is configured to secure components of the optoelectronic device. The optoelectronic device shell includes a rotatable top shell and a bottom shell. The rotatable top shell is configured to pivotably rotate about an upper rear end of the bottom shell. The rotatable top shell includes a body means for securing the rotatable top shell relative to the bottom shell. A curved tongue is defined on one end of the body and is configured to rotate about a corresponding curved mating surface on the upper rear end of the bottom shell. The tongue and the means for securing the rotatable top shell relative to the bottom shell are configured to secure the rotatable top shell relative to the bottom shell.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

Reference will now be made to the drawings to describe various aspects of exemplary embodiments of the invention.

It is to be understood that the drawings are diagrammatic and schematic representations of such exemplary embodiments, and are not limiting of the present invention, nor are they necessarily drawn to scale.

Embodiments of the invention are concerned with the top shell of a module such as an optoelectronic transceiver module that is configured to be rotatably coupled to a bottom shell of the module. Advantageously, embodiments of the invention enable one or more components of the module to be accurately secured therein. Further, in one embodiment, the top shell can be secured to the bottom shell without using fasteners such as a screw or the like. This facilitates reduction of assembly cost, assembly time, and assembly complexity.

Embodiments of the present invention can be implemented in various optoelectronic devices. As used herein, the term "optoelectronic device" includes devices having both optical and electrical components. Examples of optoelectronic devices include, but are not limited to, transponders, transceivers, transmitters, and/or receivers. Optoelectronic devices can be used, for example, in telecommunications networks, local area networks, metro area networks, storage area networks, wide area networks, and the like.

The principles of the present invention may be implemented in optoelectronic devices of any form factor currently available or that may be developed in the future for 1G, 2G, 2.5G, 4G, 8G, 10G, or higher signaling, without restriction. In addition, although one optoelectronic device in which embodiments of the invention can be implemented is configured to have a form factor that is substantially compliant with the SFP+ (IPF) MSA, the optoelectronic device can alternatively be configured to have a variety of different form factors that are substantially compliant with other MSAs including, but not limited to, the SFF MSA or the SFP MSA.

In the summary above and the description that follows, reference is made to the x-direction, y-direction, and z-direction. As used herein, the "x-direction" is perpendicular to the cross-sectional plane of FIGS. 3 and 4 and corresponds to width in FIGS. 1-4. The "y-direction" corresponds to the vertical direction in FIGS. 3 and 4 and further corresponds to height in FIGS. 1-4. References to "up" and "down" and variations thereof correspond to the positive and negative y-directions, respectively. The "z-direction" corresponds to the horizontal direction in FIGS. 3 and 4 and further corresponds to length in FIGS. 1-4. References to "front" and "rear" and variations thereof correspond to the positive and negative z-directions, respectively.

Figure 1:
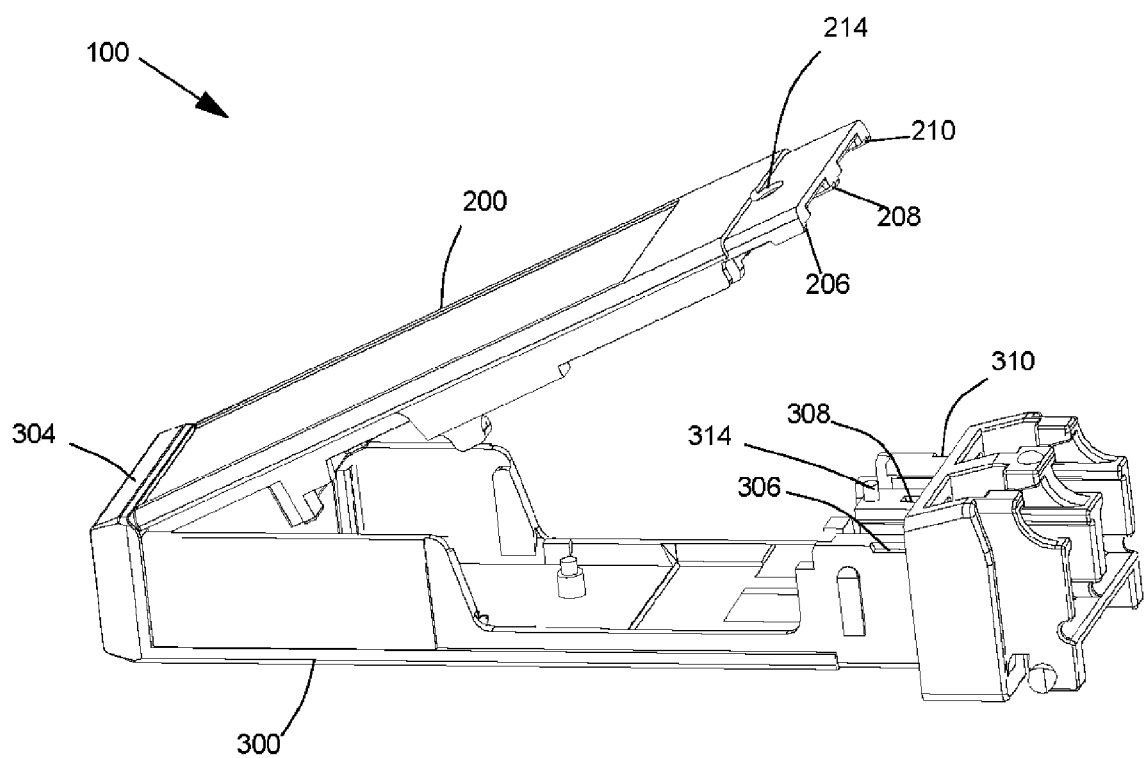
FIG. 1 illustrates an isometric view of an example optoelectronic transceiver shell in accordance with an embodiment of the present invention.

FIG. 1 is an illustration of one embodiment of a shell assembly 100 that can be implemented in optoelectronic transceiver module or other optoelectronic device. Alternately or additionally, the shell assembly 100 can be implemented in electronic devices. The shell assembly 100 includes, but is not limited to, a top shell 200 and a bottom shell 300. The top shell 200 pivots about an upper rear end 304 of the bottom shell 300 on one end and on the other end the top shell 200 includes a plurality of projections defining nubs 206, 208, 210. The bottom shell 300 includes a plurality of cavities 306, 308, 310 located therein for accommodating and securing the nubs 206, 208, 210 respectively.

Figure 2:
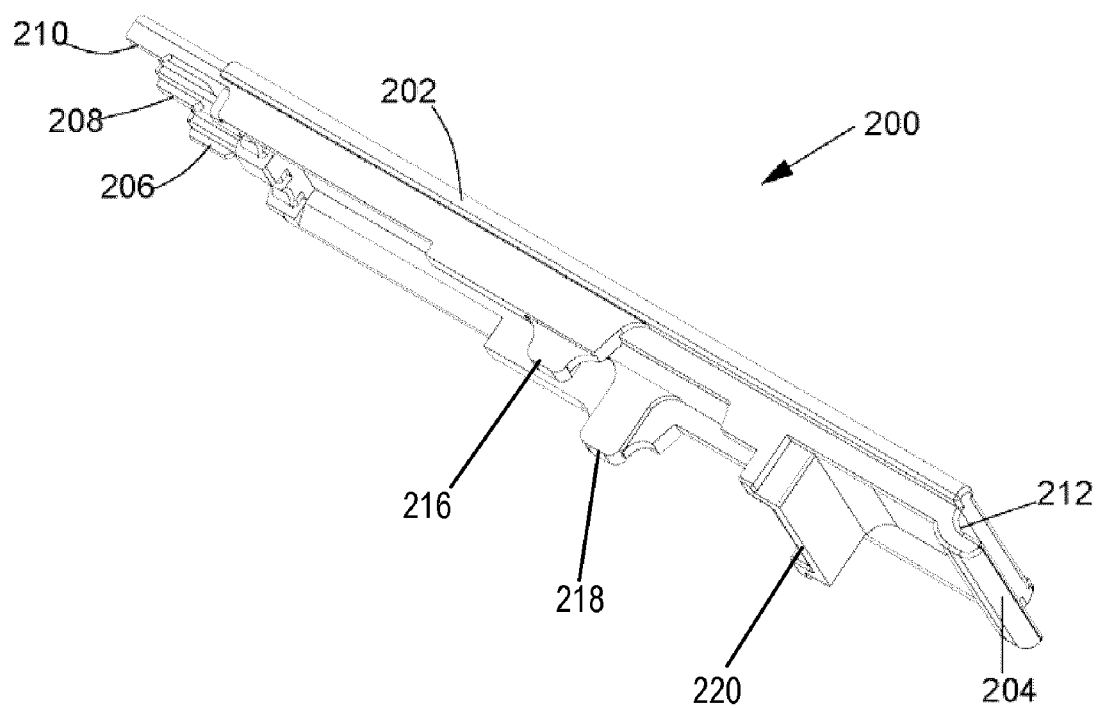
FIG. 2 illustrates an isometric view of a top shell in accordance with an embodiment of the present invention.

FIG. 2 depicts an isometric view of the example top shell 200 of FIG. 1. The top shell 200 consists of a body 202, a tongue 204 and a plurality of nubs 206, 208, 210. As illustrated, the tongue 204 is a curved tongue. In one embodiment, the tongue is half c shaped for providing a proper mating surface 212. Further, in this example the mating surface 212 can be designed in a manner which allows the top shell 200 to be rotated about the bottom shell 300. The top shell 200 may be inserted in the upper rear end 304 of the bottom shell 300 at any suitable angle. For instance, in one embodiment the top shell 200 may be inserted in the upper rear end 304 of the bottom shell 300 at about 45-degrees, although this is not required in all embodiments. The mating surface 212 is interchangeably referred to as a curved surface 212 throughout the specification.

Figure 3:
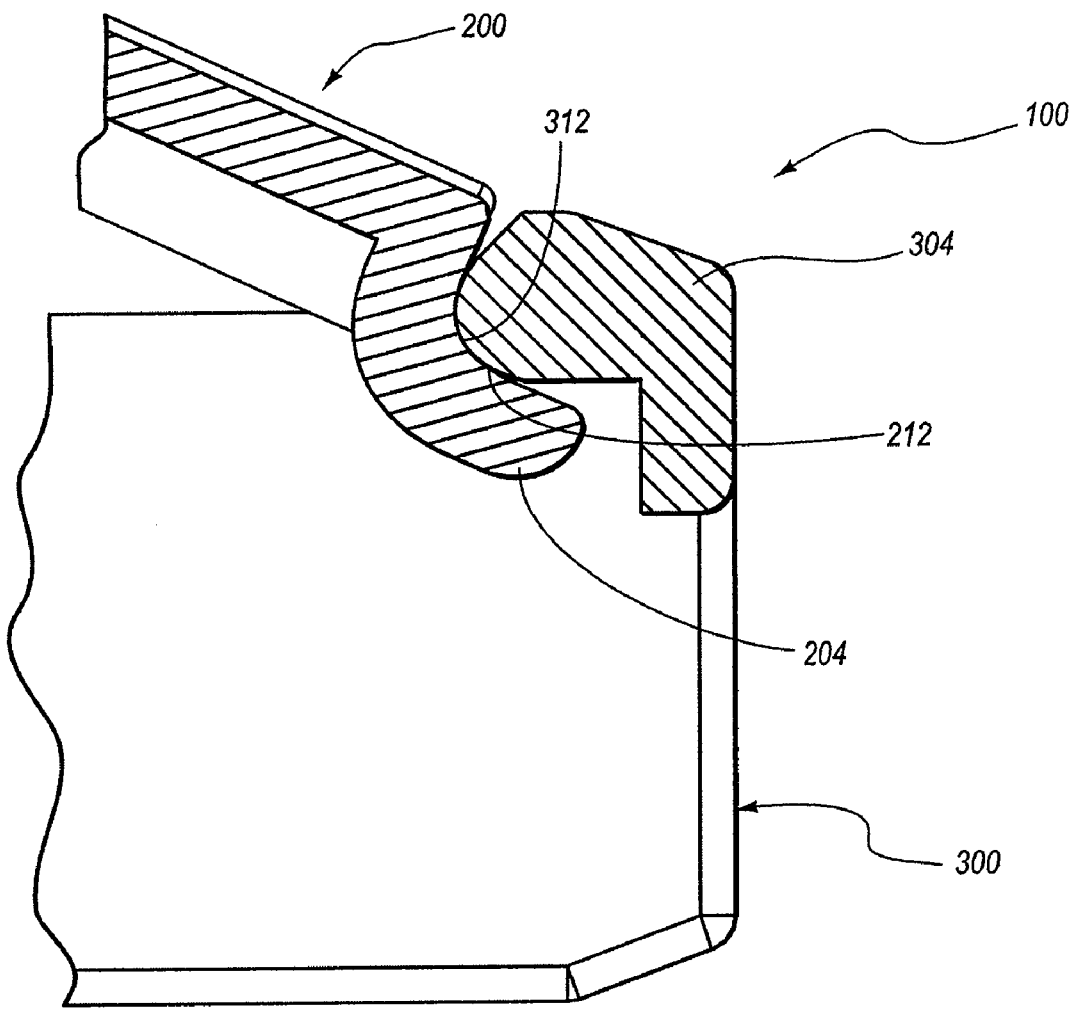
FIG. 3 illustrates a partial cross sectional view of one embodiment of a rotatable top shell and a bottom shell in an open position.
Figure 4:
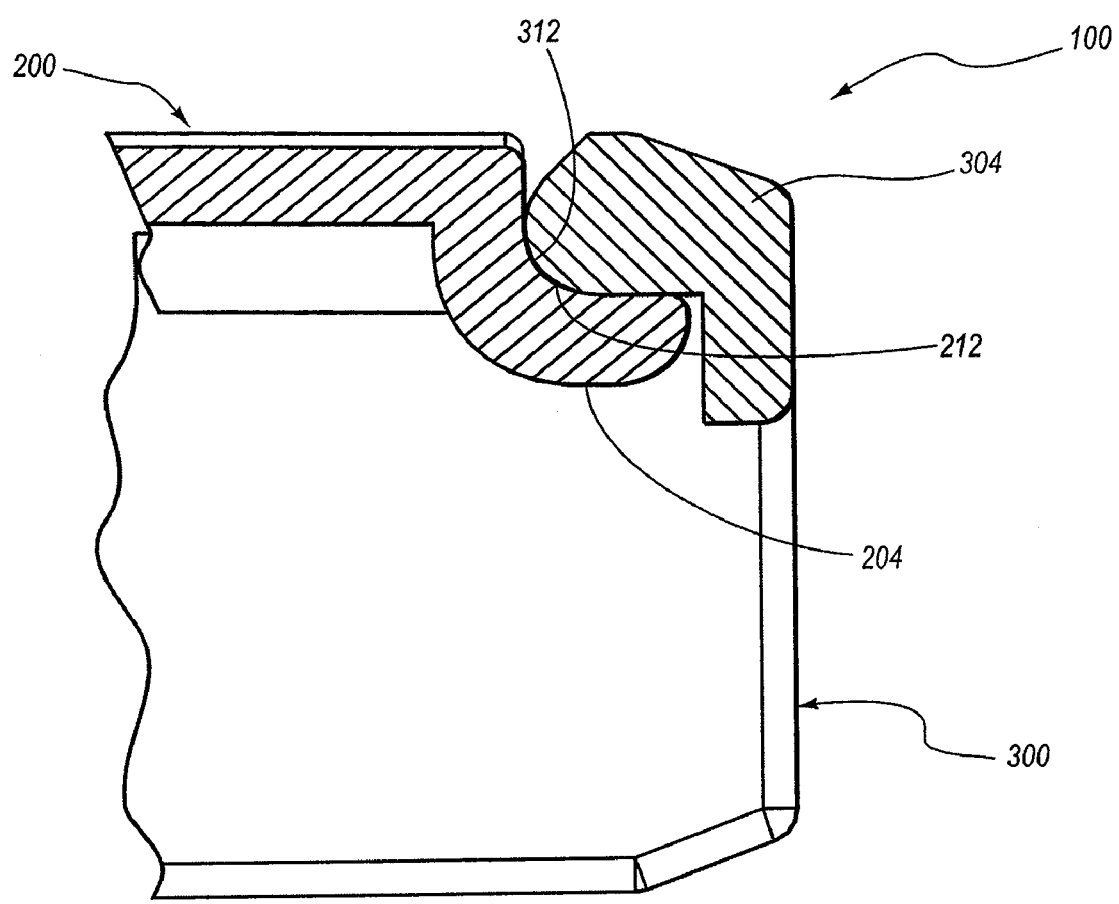
FIG. 4 illustrates a partial cross sectional view of one embodiment of a rotatable top shell and a bottom shell in a closed position.

Turning to FIG. 3 and FIG. 4, partial cross-sectional views of an example shell assembly 100 are disclosed. More specifically, FIG. 3 illustrates a cross-section, along the length (z-axis), of the example top shell 200 and the example bottom shell 300, with the top shell 200 in an open position. FIG. 4 illustrates a cross-section, along the length (z-axis), of the example shell assembly 100, with the example top shell 200 in a closed position. The curved surface 212 of the top shell 200 is configured to rest on a complimentary curved surface 312 formed at the upper rear end 304 of the bottom shell 300. In this example, the tongue 204 allows the top shell 200 to rotate about the upper rear end 304 of the bottom shell 300.

In the closed position illustrated in FIG. 4, the tongue end of the body 202 is secured in the x-direction and y-direction due to the presence of the tongue 204 underneath the upper rear end 304. Additionally, the body 202 is confined in the negative z-direction by the mating of the curved tongue 204 to the upper rear end 304.

When the rotatable top shell 200 is in the closed position illustrated in FIG. 4, the end of the body 202 opposite the tongue end (referred to herein as the "front end") can be secured in the x-direction and/or the z-direction by one or more of a plurality of securing means, including nubs 206, 208, 210, the sides of the body, a hole 214 configured to receive retention pin 314, the front end of the body 202, a fastener (e.g., a screw, clip, snap fit element, or the like), and the like or any combination thereof.

For instance, the nubs 206, 208, 210 at the front end of the body 202 may interlock with corresponding cavities 306, 308, 310 in the bottom shell 300 and thereby in combination with the tongue 204 secure the front end of the body 202 in the x-direction and z-direction. Alternately or additionally, the front end of the rotatable top shell 200 can be confined in the z-direction by the positioning of the front end of the body 202 against the wall formed at the front of the bottom shell 300 (e.g., immediately in front of the cavities 306, 308, 310) in conjunction with the curved tongue 204. Alternately or additionally, the front end of the top shell 200 can be confined in the x-direction by the sides of the top shell fitting into the main cavity defined by the bottom shell.

Alternately or additionally, the front end of the top shell can be confined in the x-direction and the z-direction by reception of the securing or retention pin 314 through the hole 214 in collaboration with the curved tongue. Alternately or additionally, a fastener can be used in conjunction with the hole 214 and/or retention pin 314 to secure the front end of the rotatable top shell 200 in the x-direction and the z-direction. For instance, a screw could be inserted through a hole defined in the body 202 (such as hole 214) and threaded into a corresponding cavity (not shown) defined in the bottom shell 200. Alternately or additionally, when the retention pin 314 is received by the hole 214 in the closed position, a clip or snap fit element or the like could be attached to a portion of the retention pin 314 protruding above the hole 214. In addition to securing the front end of the rotatable top shell 200 in the x-direction and the z-direction, the hole 214 in conjunction with the retention pin 314, and/or one or more fasteners are configured to secure the front end of the rotatable top shell 200 in the y-direction.

In some embodiments of the invention, as many as all of the described securing means can be used to secure the rotatable top shell (including the tongue end and the front end) in the x-direction, the y-direction, and/or the z-direction. Alternately or additionally, an EMI collar clip (not shown) may be used to capture the top shell 200 against the bottom shell 300 at the front of the shell assembly.

Accordingly, embodiments of a rotatable top shell include a curved tongue configured to rotate about a complimenting curved mating surface of a bottom shell between an open position and a closed position and further configured to secure the tongue end of the rotatable top shell in the x-direction, the y-direction and the z-direction in the closed position. Embodiments of a rotatable top shell additionally include means for securing the front end of the rotatable top shell relative to the bottom shell. As described above, the means for securing the front end of the rotatable top shell relative to the bottom shell may include one or more of: the one or more nubs 206, 208, 210 configured to interlock with cavities defined in the bottom shell, the front end configured to be positioned against or abut a wall formed in the bottom shell at the front of the bottom shell, one or more sides of the rotatable top shell configured to be received within the main cavity defined by the bottom shell, the hole 214 for receiving retention pin 314, one or more fasteners, or the like or any combination thereof.

Thus, in the embodiments disclosed, the tongue end of the top shell 200 is configured to secure with the bottom shell 300 without the need of fastener(s), such as, but not limited to, screws. This decreases, among other things, assembly cost, assembly time, and assembly complexity. The tongue 204 on the top shell 200 and the curved surface 312 on the bottom shell 300 may also be designed to simplify mold tooling. As such, all surfaces of the top shell 200 and the bottom shell 300 have clear access to their respective mold halves. This simplifies the mold tooling and eliminates the need for side pulls. Further, the downward force of the rotation of the top shell 200 against the bottom shell 300 can be used for vertical compression of the components, such as a PCB (not shown), of the optoelectronic transceiver module, thereby resulting in firmly holding the components within the shell assembly 100.

In some embodiments of the invention, the top shell 200 may further include one or more posts 216, 218, and/or one or more ribs 220 as shown in FIG. 2. The one or more posts 216, 218 and/or one or more ribs 220 may aid in providing vertical compression to the components of the optoelectronic transceiver module for securing the components within the module.

As previously indicated, the top shell 200 may further comprise a hole 214 defined in the body 202 of the top shell 200 to receive and secure the retention pin 314. In one embodiment, the hole 214 is configured to loosely accommodate the retention pin 314 when the top shell 200 is rotated about the upper rear end 304 to a closed position. The retention pin 314 may permanently secure the top shell 200 to the bottom shell 300 when the retention pin 314 is deformed (e.g. by hammering the fastening element 314) and turned into a rivet over the hole 214. Alternately or additionally, a fastener such as a clip or snap fit element can be attached to a portion of the retention pin 314 extending above the hole 214. Whether deforming the retention pin 314 or attaching a fastener thereto, the size of the deformed portion or the fastener may be configured to be greater than the diameter of the hole 214 such that the front end of the rotatable top shell cannot be removed from the front end of the bottom shell 300, thereby securing the front end in the y-direction.

The top shell 200 and/or the bottom shell 300 may be formed using a die casting process. One example material from which the top shell 200 and the bottom shell 300 can be die cast is zinc, although the top shell 200 and the bottom shell 300 may alternatively be die cast from other suitable materials such as aluminum. In one example, the zinc cast is plated with copper and/or nickel.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A shell assembly comprising:
    a rotatable to shell and a bottom shell, the rotatable to shell including:
    a body having a top surface defining a plane;
    a curved tongue defined on one end of the body, a concave surface of the curved tongue configured to rotate about an x-axis and simultaneously slide in a y-direction and a z-direction along a complimenting curved mating surface of the bottom shell to allow the rotatable top shell to rotate between an open position and a closed position, the concave surface of the curved tongue being oriented upward toward the plane defined by the top surface of the body and configured such that the x-axis translates in the y-direction and the z-direction as the rotatable top shell rotates; and
    means for securing the rotatable top shell relative to the bottom shell when the rotatable top shell is in the closed position,
    wherein the tongue and the means for securing the rotatable top shell relative to the bottom shell when the rotatable top shell is in the closed position are configured to substantially secure the body in an x-direction, the y-direction, and the z-direction to the bottom shell when the rotatable top shell is in the closed position.

2. The shell assembly of claim 1, wherein the means for securing the rotatable top shell relative to the bottom shell when the rotatable top shell is in the closed position includes a plurality of nubs defined along at least one edge of the body, wherein the nubs are configured to interlock with a corresponding plurality of cavities defined in the bottom shell when the rotatable top shell is in the closed position and are further configured to secure the body in the x-direction and the z-direction in collaboration with the tongue.

3. The shell assembly of claim 1, wherein the means for securing the rotatable top shell relative to the bottom shell when the rotatable top shell is in the closed position includes the front end of the body, wherein the front end of the body is opposite the tongue end of the body and is configured to be positioned against a wall formed in the bottom shell when the rotatable top shell is in the closed position and is configured to secure the body in the z-direction.

4. The shell assembly of claim 1, wherein the means for securing the rotatable top shell relative to the bottom shell when the rotatable top shell is in the closed position includes two sides of the rotatable top shell, wherein the two sides of the rotatable top shell are configured to be received within a main cavity defined by the bottom shell when the rotatable top shell is in the closed position.

5. The shell assembly of claim 1, wherein the means for securing the rotatable top shell relative to the bottom shell when the rotatable top shell is in the closed position includes a fastener configured to secure the end of the body opposing the tongue end to the bottom shell when the rotatable top shell is in the closed position.

6. The shell assembly of claim 5, wherein the fastener includes one or more of: a screw, a clip, and a snap fit element.

7. The shell assembly according to claim 1, wherein the body includes one or more ribs on its underside, one or more posts on its underside, or both, the one or more ribs or one or more posts being configured to vertically compress one or more components of an optoelectronic transceiver module positioned within a main cavity of the bottom shell when the rotatable top shell is in a closed position.

8. The shell assembly according to claim 1, wherein the body includes one or more of zinc cast and aluminum.

9. The shell assembly according to claim 8, wherein if the body includes zinc cast, the zinc cast is plated with copper and nickel.

10. A shell assembly of an optoelectronic or electronic device, the shell assembly comprising:
    a rotatable top shell and a bottom shell,
    wherein the rotatable top shell is configured to rotate about an upper rear end of the bottom shell, and the rotatable top shell includes:
        a body having a top surface defining a plane;
        a curved tongue defined on one end of the body, a concave surface of the curved tongue being oriented upward toward the plane defined by the top surface of the body and configured to rotate about an x-axis and simultaneously slide in a y-direction and a z-direction along a corresponding curved mating surface on the upper rear end of the bottom shell such that the x-axis translates in the y-direction and the z-direction as the curved tongue rotates; and
        means for securing the rotatable top shell relative to the bottom shell when the rotatable top shell is in a closed position; and
    wherein the bottom shell includes:
        an upper rear end including the curved mating surface; and
        a main cavity defined by the bottom shell.

11. The shell assembly of claim 10, wherein the means for securing the rotatable top shell relative to the bottom shell includes a hole defined in the body and the bottom shell further includes a retention pin, and wherein the hole is configured to receive the retention pin.

12. The shell assembly of claim 11, wherein when the rotatable top shell is in a closed position, the retention pin is configured to be deformed over the hole into a rivet head to permanently secure the rotatable top shell in the closed position.

13. The shell assembly of claim 11, wherein when the rotatable top shell is in a closed position, a fastener can be attached to a portion of the retention pin protruding above the hole such that the rotatable top shell is confined to the closed position.

14. The shell assembly of claim 13, wherein the fastener includes one or more of a clip and a snap fit element.

15. The shell assembly of claim 10, wherein the body includes one or more ribs on its underside, one or more posts on its underside, or both, the one or more ribs or one or more posts being configured to vertically compress one or more components of the optoelectronic device positioned within the main cavity when the rotatable top shell is in a closed position.

16. The shell assembly of claim 10, wherein the tongue and the means for securing the rotatable top shell relative to the bottom shell when the rotatable top shell is in the closed position are configured to substantially secure the body to the optoelectronic device in an x-direction, y-direction and z-direction when the body is in the closed position.

17. The shell assembly of claim 10, wherein the optoelectronic device is substantially compliant with one or more of: the SFP+ (IPF) MSA, the SFF MSA, and the SFP MSA.

18. The shell assembly of claim 10, wherein means for securing the rotatable top shell relative to the bottom shell includes one or more of:
    a plurality of nubs defined along at least one edge of the body, wherein the nubs are configured to interlock with a corresponding plurality of cavities defined in the bottom shell when the rotatable top shell is in the closed position;
    the end of the body opposing the curved tongue end, wherein the end of the body opposing the curved tongue end is configured to abut a wall formed at the front of the bottom shell when the rotatable top shell is in the closed position; and
    two sides of the rotatable top shell, wherein the two sides of the rotatable top shell are configured to be received within the main cavity defined by the bottom shell when the rotatable top shell is in the closed position.

19. The shell assembly of claim 10, wherein the cross-section of the curved tongue is substantially a half c shape and is configured to be inserted under the corresponding curved mating surface on the upper rear end of the bottom shell.

* * * * *